United States Patent
Aoki

(10) Patent No.: US 7,728,080 B2
(45) Date of Patent: Jun. 1, 2010

(54) SOLVENTLESS SILICONE PRESSURE-SENSITIVE ADHESIVE COMPOSITION

(75) Inventor: Shunji Aoki, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 12/057,595

(22) Filed: Mar. 28, 2008

(65) Prior Publication Data

US 2008/0242807 A1  Oct. 2, 2008

(30) Foreign Application Priority Data

Mar. 30, 2007  (JP) ............... 2007-091031

(51) Int. Cl.
*C08L 83/05* (2006.01)
*C08L 83/07* (2006.01)
*C08G 77/00* (2006.01)
*C08G 77/38* (2006.01)

(52) U.S. Cl. .................. 525/478; 525/477; 528/31; 528/32; 528/33

(58) Field of Classification Search ............ 525/478
See application file for complete search history.

(56) References Cited

U.S. PATENT DOCUMENTS 5,110,882 A    5/1992  Hamada et al.
5,122,562 A *  6/1992  Jeram et al. ............. 524/403
5,254,644 A * 10/1993  Kobori et al. ........... 525/478

FOREIGN PATENT DOCUMENTS

| EP | 355991 A2 * | 2/1990 |
| EP | 0 506 370 A2 | 9/1992 |
| EP | 0 506 371 A2 | 9/1992 |
| EP | 0 506 372 A2 | 9/1992 |
| EP | 0 581 539 A2 | 2/1994 |

* cited by examiner

*Primary Examiner*—Randy Gulakowski
*Assistant Examiner*—Mike Dollinger
(74) *Attorney, Agent, or Firm*—Oblon, Spivak, McClelland, Maier & Neustadt, L.L.P.

(57) ABSTRACT

A solventless silicone pressure-sensitive adhesive composition is provided. The composition includes (A) a polyorganosiloxane with a polymerization degree of 300 to 2,000 and having at least two alkenyl group-containing organic groups, (B) a polyorganohydrosiloxane having at least three silicon-bonded hydrogen atoms, (C) a polydiorganosiloxane having alkenyl groups at both terminals, (D) a polydiorganosiloxane having SiH groups at both terminals, (E) a polyorganosiloxane composed of $R^2_3SiO_{1/2}$ units and $SiO_2$ units ($R^2$ is a monovalent hydrocarbon group), and (F) a platinum-based catalyst. The composition enables the prevention of problems caused by residual or volatilized organic substances, such as the absorption of ultraviolet radiation or the like, and also enables ready removal of the composition without deforming or damaging the adherend.

11 Claims, No Drawings

SOLVENTLESS SILICONE PRESSURE-SENSITIVE ADHESIVE COMPOSITION

BACKGROUND OF THE INVENTION

1. Field of the Invention

The present invention relates to a solventless silicone pressure-sensitive adhesive composition.

2. Description of the Prior Art

Pressure-sensitive adhesive tapes and pressure-sensitive adhesive labels that use a silicone pressure-sensitive adhesive contain a silicone pressure-sensitive adhesive layer that exhibits excellent levels of heat resistance, cold resistance, weather resistance, electrical insulation and chemical resistance, and they are consequently used under severe conditions where organic pressure-sensitive adhesives such as acrylic pressure-sensitive adhesives or rubber-based pressure-sensitive adhesives would suffer deformation or degradation. Furthermore, because they also exhibit favorable adhesion to all manner of adherends, they are also used for bonding polyolefin resins, silicone resins, fluororesins and moisture-containing surfaces, which are difficult to bond using organic pressure-sensitive adhesives such as acrylic pressure-sensitive adhesives or rubber-based pressure-sensitive adhesives.

For example, during the production, processing or assembly of electronic or electrical componentry, pressure-sensitive adhesive tapes containing a silicone pressure-sensitive adhesive are used. When heat treatments are conducted during these productions steps, the electronic or electrical component or a member thereof often needs to be protected, masked or temporarily secured, either across the entire surface or at a portion of the surface of the component or member. A pressure-sensitive adhesive tape used for these types of applications, or a pressure-sensitive adhesive tape used in the production, securing or bonding of an electronic or electrical component that is exposed to high temperatures preferably employs a silicone pressure-sensitive adhesive that exhibits favorable heat resistance even after heating at temperatures exceeding 250° C. However, modern production and processing steps for electronic or electrical componentry not only often include multiple stages in which heating, cooling, washing and irradiation and the like are conducted repeatedly, but are also requiring increasing levels of precision and complexity. Moreover, in order to prevent dust, processing is often conducted within an enclosed space such as a clean room or a clean booth.

If a pressure-sensitive adhesive tape or pressure-sensitive adhesive label that uses a conventional silicone pressure-sensitive adhesive is bonded to, or used for masking, an adherend, and is subsequently subjected to a heat history at a high temperature of 100 to 250° C., then minute quantities of residual aromatic hydrocarbons within the pressure-sensitive adhesive layer such as toluene, xylene, ethylbenzene and benzene tend to volatilize. These aromatic hydrocarbons are contained within the silicone pressure-sensitive adhesive composition. If a pressure-sensitive adhesive tape that uses a silicone pressure-sensitive adhesive is used within the type of enclosed space described above for the production of an electronic or electrical component, volatile materials such as the above aromatic hydrocarbons are generated, and if ultraviolet irradiation is conducted in a subsequent step, then the ultraviolet radiation is absorbed by the aromatic hydrocarbons, which can cause a deterioration in the efficiency of the irradiation step.

Moreover, recent electronic components continue to become smaller, more detailed and thinner. If protective masking is conducted using pressure-sensitive adhesive tapes that contain widely used pressure-sensitive adhesives, then when the masking tape is peeled away (removed) following completion of a specified treatment, the adhesive strength may sometimes be overly powerful, meaning fine structures on the electronic component that functions as the adherend, or even the electronic component itself, may undergo deformation or damage. Furthermore, when such electronic components are masked, the tape is sometimes bonded over a large surface area. When a masking tape that has been bonded over a large area is peeled away, if the adhesive strength is too powerful, then the peeling operation may be difficult, and the adherend may undergo deformation or damage. Furthermore, even in cases other than those using a pressure-sensitive adhesive tape, such as when a pressure-sensitive adhesive-treated film is bonded to an adherend, if the adhesive strength of the pressure-sensitive adhesive film is overly powerful, then removal may be difficult, and the adherend may undergo deformation or damage. Examples of the adherend include all manner of electronic components, flat panel displays, window glass and wall surfaces, and examples of pressure-sensitive adhesive-treated films include dirt prevention films, scratch prevention films, anti-reflective films, light-shielding films, glass shatter-resistant films, and masking films for decoration or advertising.

Furthermore, in applications such as pressure-sensitive adhesive tapes and pressure-sensitive adhesive labels that are used for construction or interior decorating purposes, the surface of the adherend may either include a silicone resin or fluororesin, or be treated with a silicone resin or fluororesin, in order to provide the surface with favorable water repellency, oil repellency and/or dirt prevention properties. Because acrylic pressure-sensitive adhesives do not exhibit favorable adhesion to these types of surfaces, silicone pressure-sensitive adhesives are often used. In the case of pressure-sensitive adhesive tapes and pressure-sensitive adhesive labels used in living environments, such as pressure-sensitive adhesive papers for bonding wallpaper, pressure-sensitive adhesive papers for bonding decorative sheets for furniture and the like, waterproof and airtight pressure-sensitive adhesive tapes, pressure-sensitive adhesive tapes for interior bonding applications, repair tapes, tapes for securing ornaments, pressure-sensitive adhesive films for shatter-resistant glass, light-shielding pressure-sensitive adhesive films and tapes for securing items inside vehicles, if residual aromatic hydrocarbon solvents are present, and these volatilize and accumulate within the interior airspace, then even if the quantities are extremely small, they can cause chemical substance allergies, sick house syndrome, and chemical substance hypersensitivity.

Furthermore, in applications where bonding is conducted directly to the skin, such as medicinal patches, sticking plasters, surgical tapes, and tapes for sports taping, the existence of residual aromatic hydrocarbon solvents can cause skin irritation.

In order to address these types of problems, a solventless silicone pressure-sensitive adhesive composition has been proposed that comprises an organopolysiloxane having lower alkenyl groups at both terminals of a straight-chain molecular chain, a polyorganosiloxane comprising $R_3SiO_{0.5}$ units and $SiO_2$ units, an organohydrogenpolysiloxane having at least two SiH groups within each molecule, and a platinum-based catalyst (see patent reference 1). However, this composition is prone to increases in the viscosity, can suffer from poor coating properties upon application to substrates, and exhibits a lower level of adhesive strength if the viscosity of the composition is reduced.

Furthermore, pressure-sensitive silicone adhesive compositions with a high solid fraction, in which the main components include a copolymer comprising $R_3SiO_{1/2}$ units and $SiO_{4/2}$ units, an alkenyl group-terminated polydiorganosiloxane, and a hydride-terminated organohydrogenpolysiloxane are also known (see patent references 2 to 5). However, these compositions are also prone to increases in viscosity, can suffer from poor coating properties upon application to substrates, and exhibit a lower level of adhesive strength if the viscosity of the composition is reduced.

[Patent Reference 1] U.S. Pat. No. 5,110,882
[Patent Reference 2] EP 0506370 A2
[Patent Reference 3] EP 0506371 A2
[Patent Reference 4] EP 0506372 A2
[Patent Reference 5] EP 0581539 A2

SUMMARY OF THE INVENTION

The present invention aims to improve upon the issues described above, and has an object of providing a silicone pressure-sensitive adhesive composition that contains no organic solvents, enabling the prevention of problems caused by residual or volatilized organic substances, such as the absorption of ultraviolet radiation or the like, the contamination of electronic and electrical componentry, adverse effects on humans and skin irritation, and also exhibits an appropriately adjusted level of adhesive strength that enables ready removal of the composition without deforming or damaging the adherend.

As a result of intensive investigation, the inventor of the present invention has discovered that using a solventless silicone pressure-sensitive adhesive composition comprising:

(A) a polyorganosiloxane having at least two alkenyl group-containing organic groups within each molecule, as represented by an average composition formula (1) shown below:

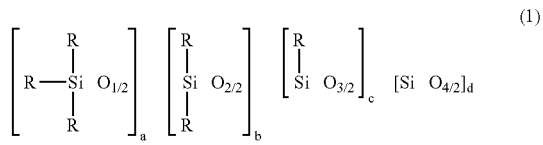

wherein, R represents identical or different monovalent hydrocarbon groups of 1 to 10 carbon atoms, provided that at least two R groups contain alkenyl group-containing organic groups of 2 to 10 carbon atoms, a represents an integer of 2 or greater, b represents an integer of 1 or greater, and c and d each represent an integer of 0 or greater, provided that $300 \leq a+b+c+d \leq 2,000$, (B) a polyorganohydrosiloxane having at least three SiH groups within each molecule, (C) a polydiorganosiloxane having alkenyl groups at both terminals, as represented by a formula (2) shown below:

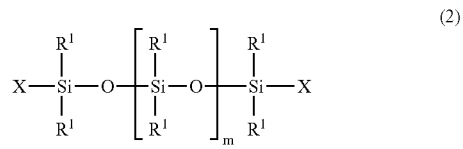

wherein, $R^1$ represents a methyl group or phenyl group, X represents an alkenyl group of 2 to 20 carbon atoms, and m satisfies $0 \leq m \leq 20$, (D) a polydiorganosiloxane having SiH groups at both terminals, as represented by a formula (3) shown below:

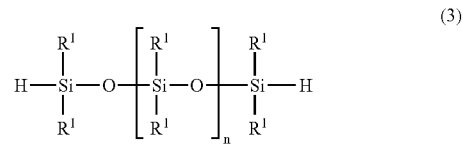

wherein, $R^1$ represents a methyl group or phenyl group, and n satisfies $0 \leq n \leq 20$, (E) a polyorganosiloxane consisting of $R^2_3SiO_{1/2}$ units and $SiO_2$ units, in which a molar ratio of $R^2_3SiO_{1/2}$ units/$SiO_2$ units is within a range from 0.6 to 1.0 wherein $R^2$ represents a monovalent hydrocarbon group of 1 to 10 carbon atoms, and (F) a platinum-based catalyst, was effective in achieving the object described above.

Moreover, they also discovered that if a solventless silicone pressure-sensitive adhesive composition comprising the above components (A) through (F) was used, then the composition contained no organic solvents, enabling the prevention of problems caused by residual or volatilized organic substances, such as the absorption of ultraviolet radiation or the like, the contamination of electronic and electrical componentry, adverse effects on humans and skin irritation, and that the composition could be adjusted to a viscosity suitable for coating, which was effective in the production of pressure-sensitive adhesive tapes, pressure-sensitive adhesive films, pressure-sensitive adhesive sheets and pressure-sensitive adhesive labels and the like.

According to the present invention, a solventless silicone pressure-sensitive adhesive composition that contains no organic solvents can be obtained. There are no adverse effects resulting from residual organic solvent within pressure-sensitive adhesive tapes. Because pressure-sensitive adhesive tapes and the like that use this composition are bonded to adherends with an appropriate level of adhesive strength, they can be removed easily, and consequently damage or deformation of the adherend does not occur upon removal of the tape. The composition has a viscosity that ensures favorable coating onto substrates.

DETAILED DESCRIPTION OF THE PREFERRED EMBODIMENTS

A more detailed description of the composition of the present invention is provided below.

[Component (A)]

The polyorganosiloxane of the component (A) is an essentially straight-chain polyorganosiloxane having alkenyl group-containing organic groups within the molecule, as represented by an average composition formula (1) shown below.

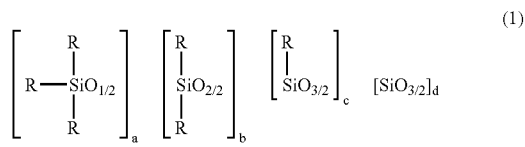

(wherein, R represents identical or different monovalent hydrocarbon groups of 1 to 10 carbon atoms, provided that at least two R groups contain alkenyl group-containing organic groups of 2 to 10 carbon atoms, a represents an integer of 2 or greater, b represents an integer of 1 or greater, and c and d each represent an integer of 0 or greater, provided that $300 \leq a+b+c+d \leq 2,000$)

R is a monovalent hydrocarbon group of 1 to 10 carbon atoms, and of all the R groups, at least two groups are alkenyl group-containing organic groups. Specific examples of R include alkyl groups such as a methyl group, ethyl group, propyl group or butyl group, cycloalkyl groups such as a cyclohexyl group, aryl groups such as a phenyl group or tolyl group, and groups in which a portion of, or all of, the hydrogen atoms bonded to carbon atoms within one of the above groups have been substituted with another group, such as a 3,3,3-trifluoropropyl group, 3-hydroxypropyl group or 3-aminopropyl group. A methyl group or phenyl group is preferred.

Furthermore, the alkenyl group-containing organic group preferably contains 2 to 10 carbon atoms, and examples include alkenyl groups such as a vinyl group, allyl group, hexenyl group, and octenyl group; acryloylalkyl groups and methacryloylalkyl groups such as an acryloylpropyl group, acryloylmethyl group, methacryloylpropyl group; cycloalkyl groups such as cyclohexenylethyl group, and alkenyloxyalkyl groups such as a vinyloxypropyl group, although industrially, a vinyl group is particularly preferred.

Moreover, as shown in the average composition formula below, the component (A) preferably comprises the alkenyl group-containing organic groups at both terminals of the molecular chain.

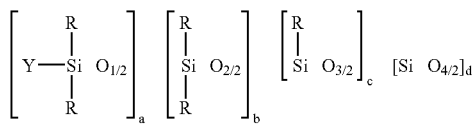

wherein Y represents an aforementioned alkenyl group-containing organic group of 2 to 10 carbon atoms, and R, a, b, c and d are as defined above.

The alkenyl group content within the component (A) is typically within a range from 0.1 to 4 mol %, and preferably from 0.1 to 1 mol %, relative to all of the organic groups within the polyorganosiloxane. If this content is less than 0.1 mol %, then the curability deteriorates, whereas if the content exceeds 4 mol %, then the adhesive strength and the tack of the resulting composition are reduced too far, making the composition unsuitable.

The viscosity at 25° C. of the polyorganosiloxane is preferably within a range from 2,000 to 1,000,000 mPa·s, and is even more preferably from 5,000 to 300,000 mPa·s. Furthermore, this polyorganosiloxane preferably has an essentially straight-chain structure, and specifically, the quantities of $RSiO_{3/2}$ units and $SiO_{4/2}$ units are preferably both not more than 2 mol % of all the siloxane units within the component (A).

The component (A) is usually produced by using a catalyst to polymerize a monomer such as octamethylcyclotetrasiloxane, a silane compound or siloxane compound containing a dimethylvinylsiloxane unit, and a silane compound or siloxane compound containing a methylsiloxane unit. However, because the product includes cyclic low molecular weight siloxanes following completion of the polymerization, these cyclic low molecular weight siloxanes are preferably removed by distillation prior to use, either by heating and/or by blowing a stream of an inert gas under reduced pressure.

[Component (B)]

The component (B) is a cross-linking agent, is a polyorganohydrosiloxane having at least three hydrogen atoms bonded to silicon atoms within each molecule, and may have a straight-chain, branched or cyclic structure. Examples of the component (B) include compounds represented by the formula (4) and the formula (5) shown below, although the component (B) is not restricted to compounds of these formulas. The component (B) may be either a single compound, or a combination of two or more different compounds.

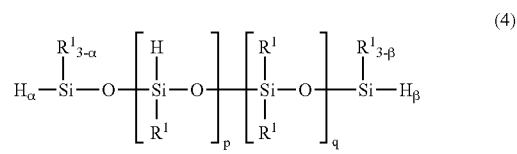

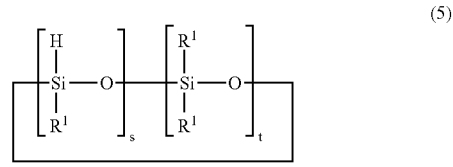

(In each of the formulas (4) and (5), $R^1$ represents a methyl group or phenyl group; in the formula (4), α and β each represent, independently, either 0 or 1, p represents an integer of 1 or greater, and q represents an integer of 0 or greater, provided that $\alpha+\beta+p$ is 3 or greater, and $1 \leq p+q \leq 500$; and in the formula (5), s represents an integer of 3 or greater, and t represents an integer of 0 or greater, provided that $3 \leq s+t \leq 8$).

The viscosity at 25° C. of this polyorganohydrosiloxane is preferably within a range from 1 to 1,000 mPa·s, and is even more preferably from 2 to 500 mPa·s. A mixture of two or more different compounds may also be used.

[Component (C)]

The component (C) is a polydiorganosiloxane having alkenyl groups at both terminals, as represented by the formula (2) shown below.

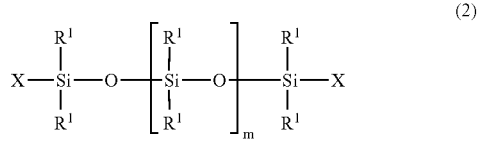

(wherein, $R^1$ represents a methyl group or phenyl group, X represents an alkenyl group of 2 to 20 carbon atoms, and m satisfies $0 \leq m \leq 20$)

At least 90 mol % of the $R^1$ groups are preferably methyl groups. X is preferably a vinyl group. m preferably satisfies $3 \leq m \leq 15$.

In terms of ensuring favorable coating properties for the composition, the viscosity at 25° C. of this polydiorganosiloxane is preferably less than 10 mPa·s. Furthermore, in terms of ensuring appropriate suppression of volatilization during the curing reaction, the viscosity is preferably at least 2 mPa·s. Viscosity values from 2 to 8 mPa·s are particularly preferred. A mixture of two or more different compounds may also be used.

[Component (D)]

The component (D) is a polydiorganohydrosiloxane having SiH groups at both terminals, as represented by the formula (3) shown below.

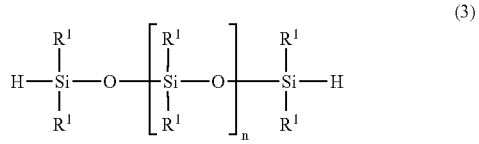

(3)

(wherein, $R^1$ represents a methyl group or phenyl group, and n satisfies $0 \leq n \leq 20$).

At least 90 mol % of the $R^1$ groups are preferably methyl groups. n preferably satisfies $3 \leq n \leq 15$.

In terms of ensuring favorable coating properties for the composition, the viscosity at 25° C. of this polydiorganosiloxane is preferably less than 10 mPa·s. Furthermore, in terms of ensuring appropriate suppression of volatilization during the curing reaction, the viscosity is preferably at least 2 mPa·s. Viscosity values from 2 to 8 mPa·s are particularly preferred. A mixture of two or more different compounds may also be used.

Blending of the components is preferably conducted so that the molar ratio of SiH groups within the components (B) and (D), relative to alkenyl groups contained within the components (A) and (C), is within a range from 0.5 to 5, even more preferably from 0.8 to 3.0, and most preferably from 1.0 to 2.0. If this ratio is less than 0.5, then the cross-linking may become unacceptably low, leading to a corresponding lowering of the holding force, whereas if the ratio exceeds 5, then the cross-linking density may become too high, meaning satisfactory levels of adhesive strength and tack may be unattainable.

The molar ratio of SiH groups contained in the component (D) to the alkenyl groups contained in the components (A) and (C) is preferably within a range from 0.5 to 1.5, more preferably from 0.8 to 1.2. If the ratio is less than 0.5, unreacted component (A) and/or unreacted component (C) may remain. If the ratio is more than 1.5, unreacted component (D) may remain. In either case, the resulting composition may be poor in adhesive strength or holding force.

The ratio of the component (A)/[the total of the component (C)+the component (D)] is preferably within a range from 15/85 to 85/15, and more preferably from 25/75 to 75/25, on the mass basis. If the ratio is too large, the resulting composition may have too high a viscosity to be coated. If the ratio is too small, the curability of the composition may become poor.

Furthermore, the ratio of the component (B)/[the total of the component (A)+the component (C)+the component (D)] is preferably within a range from 0.2/99.8 to 5/95, and more preferably from 0.5/99.5 to 3/97, on the mass basis. If the ratio is too small, the resulting composition may have a poor curability. If the ratio is too large, the resulting composition may have poor adhesive strength and tack.

[Component (E)]

The component (E) is a polyorganosiloxane consisting of $R^2_3SiO_{1/2}$ units (wherein, $R^2$ represents a monovalent hydrocarbon group of 1 to 10 carbon atoms) and $SiO_2$ units, in which the molar ratio of $R^2_3SiO_{1/2}$ units/$SiO_2$ units is within a range from 0.6 to 1.0, and is preferably from 0.65 to 0.90. If the molar ratio of $R^2_3SiO_{1/2}$ units/$SiO_2$ units is less than 0.6, then the adhesive strength and tack of the composition may deteriorate, whereas if the ratio exceeds 1.0, the adhesive strength and the holding power may decrease.

Examples of $R^2$ include alkyl groups such as a methyl group, ethyl group, propyl group or butyl group; cycloalkyl groups; phenyl groups; and alkenyl groups such as a vinyl group, allyl group or hexenyl group. A methyl group is preferred.

The component (E) may contain OH groups, and from the viewpoints of the cohesive force and the tack of the resulting pressure-sensitive adhesive, the OH group content is preferably within a range from 0.01 to 4.0% by mass. Furthermore, $R^2SiO_{3/2}$ units and $R^2_2SiO$ units (wherein, $R^2$ is as defined above) may also be included within the component (E) at levels that do not impair the properties of the present invention. The component (E) may also use a combination of two or more different compounds.

Relative to 100 parts by mass of the combined quantity of the components (A) through (E), the combined quantity of the components (A) through (D) is typically within a range from 70 to 30 parts by mass, with the quantity of the component (E) within a range from 30 to 70 parts by mass, and in preferred compositions, the combined quantity of the components (A) through (D) is within a range from 50 to 32 parts by mass, with the quantity of the component (E) within a range from 50 to 68 parts by mass. If the combined quantity of the components (A) through (D) is less than 30 parts by mass, then the adhesive strength and holding power of the composition tend to deteriorate, and the viscosity of the composition tends to become overly high, making application of the composition difficult, whereas if the combined quantity exceeds 70 parts by mass, then the adhesive strength and the tack tend to deteriorate.

[Component (F)]

The component (F) is an addition reaction catalyst, and examples include chloroplatinic acid, alcohol solutions of chloroplatinic acid, reaction products of chloroplatinic acid and an alcohol, reaction products of chloroplatinic acid and an olefin compound, reaction products of chloroplatinic acid and a vinyl group-containing siloxane, platinum-olefin complexes, platinum-vinyl group-containing siloxane complexes, and rhodium complexes.

The quantity added of the component (F), reported as a mass of the platinum fraction relative to the combined quantity of the components (A) through (E), is typically within a range from 5 to 2,000 ppm, and is preferably from 10 to 500 ppm. At quantities less than 5 ppm, the curability of the composition may deteriorate, the cross-linking density may fall and the holding power may deteriorate, whereas if the quantity exceeds 2,000 ppm, then the pot life for the composition may become overly short.

[Component (G)]

The component (G) is a reaction retarder, and is added to the composition so that during preparation of the silicone pressure-sensitive adhesive composition, or during application of the composition to a substrate, the treatment liquid does not undergo gelling or an increase in viscosity prior to heat curing. Any of the reaction retarders used in conventional addition reaction-curable silicone compositions may be used.

Specific examples include 3-methyl-1-butyn-3-ol, 3-methyl-1-pentyn-3-ol, 3,5-dimethyl-1-hexyn-3-ol, 1-ethynylcyclohexanol, 3-methyl-3-trimethylsiloxy-1-butyne, 3-methyl-3-trimethylsiloxy-1-pentyne, 3,5-dimethyl-3-trimethylsiloxy-1-hexyne, 1-ethynyl-1-trimethylsiloxycyclohexane, bis(2,2-dimethyl-3-butynoxy)dimethylsilane, 1,3,5,7-tetramethyl-1,3,5,7-tetravinylcyclotetrasiloxane, 1,1,3,3-tetramethyl-1,3-divinyldisiloxane, maleate esters, and adipate esters.

The blend quantity of the component (G) is typically within a range from 0 to 8.0 parts by mass per 100 parts by mass of the combination of the components (A) through (E), and quantities from 0.05 to 2.0 parts by mass are particularly preferred. If the blend quantity exceeds 8.0 parts by mass, then the curability may deteriorate.

Preparation of the composition of the present invention is conducted, for example, in the following manner. First, the component (A), the component (B), the component (C), the component (D) and the component (E) are mixed together and dissolved. In those cases where the component (E) is supplied in a solution form within a solvent, the predetermined quantity of the component (E) is mixed with either the total quantity of, or a portion of, the components (A), (B), (C) and (D), and the solvent is then removed from the mixture, either at room temperature or under heating and/or under reduced pressure. Subsequently, the component (G) and the remainder of the components (A) through (D) (where present) are added. The product is usually adjusted so that the volatile fraction concentration is, for example, not more than 10% by mass, and the product is then placed inside a container for storage or transportation. When a pressure-sensitive adhesive tape, pressure-sensitive adhesive sheet or pressure-sensitive adhesive label or the like is to be produced, the component (F) is added to the above product, mixing is conducted to form a composition of the present invention, and the composition is then coated onto any of a variety of substrates.

Furthermore, in an alternative preparation, the component (A), the component (C) and the component (E) are first mixed together and dissolved. In those cases where the component (E) is supplied in a solution form within a solvent, the predetermined quantity of the component (E) is mixed with either the total quantity of, or a portion of, the components (A) and (C), and the solvent is then removed from the mixture, either at room temperature or under heating and/or under reduced pressure. Subsequently, any residual portions of the components (A) and (C), the component (F) and the component (G) are added. The resulting product is then placed inside a container for storage or transportation. When a pressure-sensitive adhesive tape, pressure-sensitive adhesive sheet or pressure-sensitive adhesive label or the like is to be produced, the component (B) and the component (D) are added to the above product, mixing is conducted to form a composition of the present invention, and the composition is then coated onto any of a variety of substrates.

Furthermore, a composition of the present invention may also be prepared by first preparing a product by mixing the components (A) and (E) in the presence of a base catalyst, and subsequently adding the components (B), (C), (D) and (G) to this product. If required, a solvent described below may also be added. Examples of the base catalyst include metal hydroxides such as lithium hydroxide, sodium hydroxide, potassium hydroxide and calcium hydroxide, carbonates such as sodium carbonate and potassium carbonate, bicarbonates such as sodium bicarbonate, metal alkoxides such as sodium methoxide and potassium butoxide, organometals such as butyllithium, and nitrogen compounds such as potassium silanolate, ammonia gas, ammonia water, methylamine, trimethylamine and triethylamine. Ammonia gas and ammonia water are preferred. The mixing temperature can be set within a range from 20 to 150° C., although the temperature is usually within a range from room temperature to the organic solvent reflux temperature. Although there are no particular restrictions on the time, the time is typically within a range from 0.5 to 10 hours, and is preferably from 1 to 6 hours.

Next, following completion of the reaction initiated by conducting the aforementioned mixing in the presence of a base catalyst, a neutralizing agent may be added to neutralize the base catalyst if required. Examples of the neutralizing agent include acidic gases such as hydrogen chloride and carbon dioxide, organic acids such as acetic acid, octanoic acid and citric acid, and mineral acids such as hydrochloric acid, sulfuric acid and phosphoric acid.

The product obtained in this manner is usually adjusted so that the volatile fraction concentration is, for example, not more than 10% by mass, and the product is then placed inside a container for storage or transportation. When a pressure-sensitive adhesive tape, pressure-sensitive adhesive sheet or pressure-sensitive adhesive label or the like is to be produced, the component (F) is added to the above product, mixing is conducted to form a composition of the present invention, and the composition is then coated onto any of the variety of substrates described below.

Besides the components described above, other optional components may also be added to the silicone pressure-sensitive adhesive composition of the present invention. Examples of other components that can be used include unreactive polyorganosiloxanes such as polydimethylsiloxanes and polydimethyldiphenylsiloxanes, antioxidants such as phenol-based, quinone-based, amine-based, phosphorus-based, phosphite-based, sulfur-based and thioether-based antioxidants, photostabilizers such as hindered amine-based, triazole-based and benzophenone-based photostabilizers, flame retardants such as phosphate ester-based, halogen-based, phosphorus-based and antimony-based flame retardants, antistatic agents such as cationic surfactants, anionic surfactants and nonionic surfactants, dyes and pigments, and fillers such as silica.

Moreover, although the composition of the present invention is basically used as a solventless system, in those cases where a solvent is used to adjust the viscosity of the composition during coating, examples of solvents that can be used include aliphatic hydrocarbon-based solvents such as hexane, heptane, octane, isooctane, decane, cyclohexane, methylcyclohexane and isoparaffin; ketone-based solvents such as acetone, methyl ethyl ketone, 2-pentanone, 3-pentanone, 2-hexanone, 2-heptanone, 4-heptanone, methyl isobutyl ketone, diisobutyl ketone, acetonylacetone and cyclohexanone; ester-based solvents such as ethyl acetate, propyl acetate, isopropyl acetate, butyl acetate and isobutyl acetate; ether-based solvents such as diethyl ether, dipropyl ether, diisopropyl ether, dibutyl ether, 1,2-dimethoxyethane and 1,4-dioxane; polyfunctional solvents such as 2-methoxyethyl acetate, 2-ethoxyethyl acetate, propylene glycol monomethyl ether acetate and 2-butoxyethyl acetate; siloxane-based solvent such as hexamethyldisiloxane, octamethyltrisiloxane, octamethylcyclotetrasiloxane, decamethylcyclopentasiloxane, tris(trimethylsiloxy)methylsilane and tetrakis(trimethylsiloxy)silane; and mixed solvents thereof.

A pressure-sensitive adhesive layer can be obtained by applying the silicone pressure-sensitive adhesive composition prepared in the above manner to any of a variety of substrates, and then conducting curing under predetermined conditions.

Examples of the substrate include plastic films of polyester, polytetrafluoroethylene, polyimide, polyphenylene sulfide, polyamide, polycarbonate, polystyrene, polypropylene, polyethylene or polyvinyl chloride or the like, metal foils such as aluminum foil or copper foil, papers such as Japanese washi paper, synthetic papers or polyethylene-laminated papers, cloth, glass fiber, or composite substrates prepared by laminating a plurality of the above substrates.

In order to improve the adhesion between the substrate and the pressure-sensitive adhesive layer, the substrate may be subjected to a preliminary primer treatment, corona treatment, etching treatment, plasma treatment or sandblasting treatment or the like. Primer treatments and corona treatments are preferred.

Examples of primer compositions that can be used in the primer treatment include condensation-type silicone primer compositions comprising a polydiorganosiloxane having SiOH groups at the terminals, a polysiloxane having SiH groups and/or a polysiloxane having alkoxy groups, and a condensation reaction catalyst, and addition-type silicone primer compositions comprising a polydiorganosiloxane having alkenyl groups such as vinyl groups, a polysiloxane having SiH groups, and an addition reaction catalyst.

The coating method may employ conventional coating systems, and examples include a comma coater, lip coater, roll coater, die coater, knife coater, blade coater, rod coater, kiss coater, gravure coater, as well as screen coating, immersion coating and cast coating systems. The coating quantity is preferably such that the thickness of the pressure-sensitive adhesive layer following curing is within a range from 2 to 1,000 μm, and preferably from 3 to 100 μm.

The curing conditions may be set to a temperature from 80 to 180° C. for a period of 30 seconds to 3 minutes, although the conditions are not restricted to these ranges.

A pressure-sensitive adhesive tape or the like may be produced by applying the composition of the present invention directly to an aforementioned substrate, or alternatively, a pressure-sensitive adhesive tape may be produced by first applying the composition of the present invention to a release film or release paper with a releasable coating provided on the surface, conducting curing of the composition, and then transferring the resulting pressure-sensitive adhesive layer by bonding the surface of the pressure-sensitive adhesive layer to a substrate.

A silicone pressure-sensitive adhesive composition of the present invention that is blended in the manner described above is typically prepared so that the viscosity of the composition at 25° C. is within a range from 500 to 100,000 mPa·s. This viscosity is preferably from 500 to 50,000 mPa·s. At a viscosity of less than 500 mPa·s, the viscosity is overly low, which can cause a variety of problems including flowing of the composition on the substrate surface, resulting in a non-uniform surface, inferior curability, and a deterioration in the adhesive strength. If the viscosity exceeds 100,000 mPa·s, then the viscosity of the composition becomes overly high, meaning stirring during production and subsequent coating of the composition become difficult.

When a pressure-sensitive adhesive tape is prepared by applying a silicone pressure-sensitive adhesive composition of the present invention that has been blended in the manner described above to a polyimide film (of thickness 25 μm), in sufficient quantity to generate a pressure-sensitive adhesive layer of thickness 40 μm, and this pressure-sensitive adhesive tape is then measured using the 180° peel adhesive strength measurement method prescribed in JIS Z 0237, the resulting adhesive strength is preferably within a range from 2.0 to 8.0 N/25 mm, and is even more preferably from 2.0 to 6.0 N/25 mm. At values less than 2.0 N/25 mm, the adhesive strength is too low and satisfactory masking properties are unattainable, whereas at values exceeding 8.0 N/25 mm, the adhesive strength is too high, which is also undesirable as it results in inferior tape removability.

There are no particular restrictions on the adherend materials that can be masked using a pressure-sensitive adhesive tape or the like produced using a silicone pressure-sensitive adhesive composition of the present invention, and examples include the materials listed below. Namely, in the case of electronic component production, examples of adherend materials include metals such as stainless steel, copper, iron, aluminum, chrome, gold and metal alloys, materials in which the surface of one of these metals or alloys has undergone a plating treatment, rustproof treatment or coating treatment, glass, ceramics, and resins such as polytetrafluoroethylene, polyimide, epoxy resins and novolak resins. Examples of adherend articles include electronic and electrical circuit boards comprising circuit wiring laminated to a board or sheet of one of the above resins or plastics. In the case of construction applications and the like, examples of adherend materials include not only the materials described above, but also materials comprising plywood, timber, papers such as Japanese washi paper or synthetic paper, and composite materials formed using a plurality of these materials.

EXAMPLES

The present invention is described in more detail below using a series of examples and comparative examples, although the present invention is in no way limited by these examples. In the examples, "parts" refer to "parts by mass", and the values reported for the various properties refer to measured values obtained using the test methods described below. Furthermore, Me represents a methyl group, and Vi represents a vinyl group.

Viscosity

Using the method prescribed in JIS Z 8803, the viscosity of the silicone pressure-sensitive adhesive composition at 25° C. was measured using a rotational viscometer.

Adhesive Strength

A solution of the silicone pressure-sensitive adhesive composition was applied with an applicator to a polyimide film of thickness 25 μm and width 25 mm, in sufficient quantity to generate a cured layer of thickness 40 μm, and the composition was then cured by heating at 120° C. for 1 minute, thus forming a pressure-sensitive adhesive tape. This pressure-sensitive adhesive tape was bonded to a stainless steel sheet, and was then pressure bonded by rolling a 2 kg roller coated with a rubber layer two times back and forth across the tape. Following standing for approximately 20 hours at room temperature, the force (N/25 mm) required to peel the pressure-sensitive adhesive tape away from the stainless steel sheet at a speed of 300 mm/minute and an angle of 180° was measured using a tensile tester.

Holding Force

A pressure-sensitive adhesive tape was prepared using the same method as that described for the adhesive strength evaluation. This pressure-sensitive adhesive tape was bonded to the bottom edge of a stainless steel plate using an adhesion surface area of 25×25 mm, a 1 kg weight was suspended from the bottom edge of the pressure-sensitive adhesive tape, and the degree of movement in the tape following standing in a vertical state for 1 hour at 250° C. was measured using a reading microscope.

Probe Tack

A pressure-sensitive adhesive tape was prepared using the same method as that described for the adhesive strength evaluation. The tack of this pressure-sensitive adhesive tape was measured using a probe tack tester manufactured by Polyken.

Removability

A pressure-sensitive adhesive tape was prepared using the same method as that described for the adhesive strength evaluation. This pressure-sensitive adhesive tape was bonded to a copper foil of thickness 50 μm, and following standing for 1 hour at 150° C., the pressure-sensitive adhesive tape was peeled off. If the tape peeled off without causing deformation of the copper foil and without leaving any residual pressure-sensitive adhesive on the surface of the adherend, then the removability was evaluated as good, whereas if the copper foil deformed or residual pressure-sensitive adhesive was left on the copper surface, then the removability was evaluated as poor.

Example 1

A vinyl group-containing polydimethylsiloxane (A-1) represented by an average composition formula shown below (viscosity: 100,000 mPa·s) (28.65 parts),

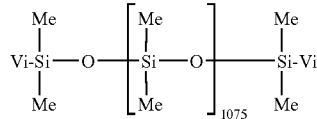

a polymethylhydrosiloxane (B-1) having SiH groups, represented by a formula shown below (viscosity: 4.6 mPa·s) (0.52 parts),

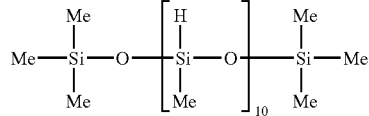

a vinyl group-containing polydimethylsiloxane (C-1) represented by an average composition formula shown below (viscosity: 7.5 mPa·s) (8.77 parts),

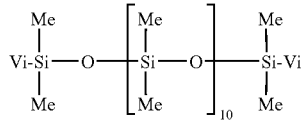

a polymethylhydrosiloxane (D-1) having SiH groups, represented by a formula shown below (viscosity: 4.5 mPa·s) (7.06 parts),

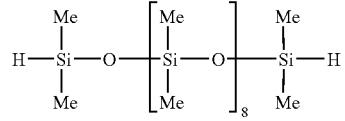

and a 60% toluene solution of a polyorganosiloxane (E) containing $Me_3SiO_{1/2}$ units and $SiO_2$ units, in which the molar ratio of $Me_3SiO_{1/2}$ units/$SiO_2$ units is 0.85 (91.67 parts) were mixed together, and the toluene was then removed by distillation under reduced pressure at 90° C. Following cooling, this product (100 parts) was combined and mixed with ethynylcyclohexanol (0.40 parts) and a silicone solution of a platinum-vinyl group-containing siloxane complex containing a platinum fraction of 0.5% by mass (1.0 parts), thus yielding a silicone pressure-sensitive adhesive composition. The viscosity at 25° C., adhesive strength, holding power, probe tack and removability of this silicone pressure-sensitive adhesive were measured. The results are shown in Table 1.

Example 2

A vinyl group-containing polydimethylsiloxane (A-1) represented by an average composition formula shown below (viscosity: 100,000 mPa·s) (13.58 parts),

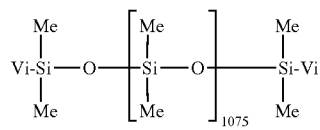

a polymethylhydrosiloxane (B-1) having SiH groups, represented by a formula shown below (viscosity: 4.6 mPa·s) (0.82 parts),

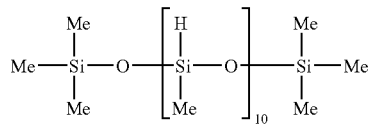

a vinyl group-containing polydimethylsiloxane (C-1) represented by an average composition formula shown below (viscosity: 7.5 mPa·s) (14.34 parts),

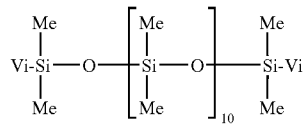

a polymethylhydrosiloxane (D-1) having SiH groups, represented by a formula shown below (viscosity: 4.5 mPa·s) (11.25 parts),

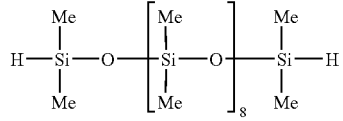

and a 60% toluene solution of a polyorganosiloxane (E) containing $Me_3SiO_{1/2}$ units and $SiO_2$ units, in which the molar ratio of $Me_3SiO_{1/2}$ units/$SiO_2$ units is 0.85 (100.0 parts) were mixed together, and the toluene was then removed by distillation under reduced pressure at 90° C. Following cooling, this product (100 parts) was combined and mixed with ethynylcyclohexanol (0.40 parts) and a silicone solution of a platinum-vinyl group-containing siloxane complex containing a platinum fraction of 0.5% by mass (1.0 parts), thus yielding a silicone pressure-sensitive adhesive composition.

The viscosity at 25° C., adhesive strength, holding power, probe tack and removability of this silicone pressure-sensitive adhesive were measured. The results are shown in Table 1.

Example 3

A vinyl group-containing polydimethylsiloxane (A-1) represented by an average composition formula shown below (viscosity: 100,000 mPa·s) (18.03 parts),

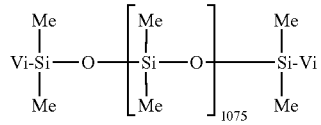

a polymethylhydrosiloxane (B-1) having SiH groups, represented by a formula shown below (viscosity: 4.6 mPa·s) (0.60 parts),

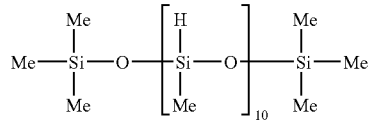

a vinyl group-containing polydimethylsiloxane (C-1) represented by an average composition formula shown below (viscosity: 7.5 mPa·s) (10.25 parts),

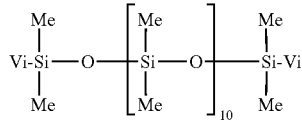

a polymethylhydrosiloxane (D-1) having SiH groups, represented by a formula shown below (viscosity: 4.5 mPa·s) (8.12 parts),

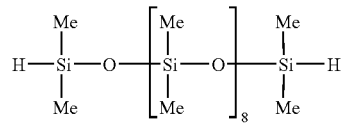

and a 60% toluene solution of a polyorganosiloxane (E) containing $Me_3SiO_{1/2}$ units and $SiO_2$ units, in which the molar ratio of $Me_3SiO_{1/2}$ units/$SiO_2$ units is 0.85 (105.0 parts) were mixed together, and the toluene was then removed by distillation under reduced pressure at 90° C. Following cooling, this product (100 parts) was combined and mixed with ethynylcyclohexanol (0.40 parts) and a silicone solution of a platinum-vinyl group-containing siloxane complex containing a platinum fraction of 0.5% by mass (1.0 parts), thus yielding a silicone pressure-sensitive adhesive composition.

The viscosity at 25° C., adhesive strength, holding power, probe tack and removability of this silicone pressure-sensitive adhesive were measured. The results are shown in Table 1.

Example 4

A vinyl group-containing polydimethylsiloxane (A-1) represented by an average composition formula shown below (viscosity: 100,000 mPa·s) (19.50 parts),

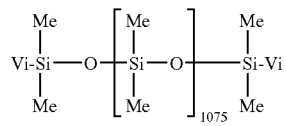

a polymethylhydrosiloxane (B-1) having SiH groups, represented by a formula shown below (viscosity: 4.6 mPa·s) (0.65 parts),

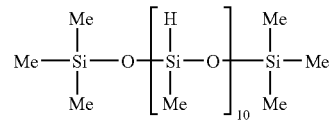

a vinyl group-containing polydimethylsiloxane (C-1) represented by an average composition formula shown below (viscosity: 7.5 mPa·s) (11.07 parts),

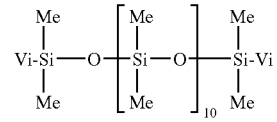

a polymethylhydrosiloxane (D-1) having SiH groups, represented by a formula shown below (viscosity: 4.5 mPa·s) (8.78 parts),

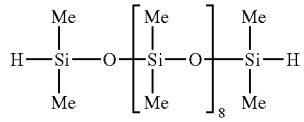

and a 60% toluene solution of a polyorganosiloxane (E) containing $Me_3SiO_{1/2}$ units and $SiO_2$ units, in which the molar ratio of $Me_3SiO_{1/2}$ units/$SiO_2$ units is 0.85 (100.0 parts) were mixed together, and the toluene was then removed by distillation under reduced pressure at 90° C. Following cooling, this product (100 parts) was combined and mixed with ethynylcyclohexanol (0.40 parts) and a silicone solution of a platinum-vinyl group-containing siloxane complex containing a platinum fraction of 0.5% by mass (1.0 parts), thus yielding a silicone pressure-sensitive adhesive composition.

The viscosity at 25° C., adhesive strength, holding power, probe tack and removability of this silicone pressure-sensitive adhesive were measured. The results are shown in Table 1.

Example 5

A vinyl group-containing polydimethylsiloxane (A-4) represented by an average composition formula shown below (viscosity: 5,000 mPa·s) (19.22 parts),

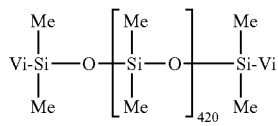

a polymethylhydrosiloxane (B-1) having SiH groups, represented by a formula shown below (viscosity: 4.6 mPa·s) (0.67 parts),

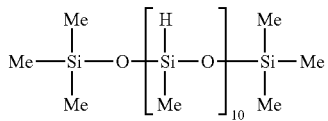

a vinyl group-containing polydimethylsiloxane (C-1) represented by an average composition formula shown below (viscosity: 7.5 mPa·s) (11.07 parts),

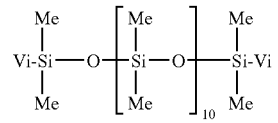

a polymethylhydrosiloxane (D-1) having SiH groups, represented by a formula shown below (viscosity: 4.5 mPa·s) (9.04 parts),

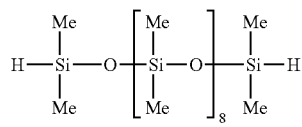

and a 60% toluene solution of a polyorganosiloxane (E) containing $Me_3SiO_{1/2}$ units and $SiO_2$ units, in which the molar ratio of $Me_3SiO_{1/2}$ units/$SiO_2$ units is 0.85 (100.0 parts) were mixed together, and the toluene was then removed by distillation under reduced pressure at 90° C. Following cooling, this product (100 parts) was combined and mixed with ethynylcyclohexanol (0.40 parts) and a silicone solution of a platinum-vinyl group-containing siloxane complex containing a platinum fraction of 0.5% by mass (1.0 parts), thus yielding a silicone pressure-sensitive adhesive composition.

The viscosity at 25° C., adhesive strength, holding power, probe tack and removability of this silicone pressure-sensitive adhesive were measured. The results are shown in Table 1.

Example 6

A vinyl group-containing polydimethylsiloxane (A-1) represented by an average composition formula shown below (viscosity: 100,000 mPa·s) (19.51 parts),

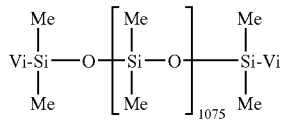

a polymethylhydrosiloxane (B-1) having SiH groups, represented by a formula shown below (viscosity: 4.6 mPa·s) (0.52 parts),

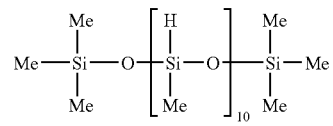

a vinyl group-containing polydimethylsiloxane (C-2) represented by an average composition formula shown below (viscosity: 9.0 mPa·s) (10.82 parts),

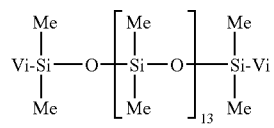

a polymethylhydrosiloxane (D-2) having SiH groups, represented by a formula shown below (viscosity: 8.1 mPa·s) (9.15 parts),

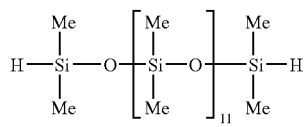

and a 60% toluene solution of a polyorganosiloxane (E) containing $Me_3SiO_{1/2}$ units and $SiO_2$ units, in which the molar ratio of $Me_3SiO_{1/2}$ units/$SiO_2$ units is 0.85 (100.0 parts) were mixed together, and the toluene was then removed by distillation under reduced pressure at 90° C. Following cooling, this product (100 parts) was combined and mixed with ethynylcyclohexanol (0.40 parts) and a silicone solution of a platinum-vinyl group-containing siloxane complex containing a platinum fraction of 0.5% by mass (1.0 parts), thus yielding a silicone pressure-sensitive adhesive composition.

The viscosity at 25° C., adhesive strength, holding power, probe tack and removability of this silicone pressure-sensitive adhesive were measured. The results are shown in Table 1.

Example 7

A vinyl group-containing polydimethylsiloxane (A-2) represented by an average composition formula shown below (viscosity: 1,000 mPa·s) (18.87 parts),

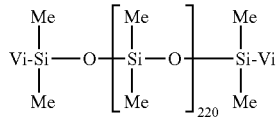

a polymethylhydrosiloxane (B-1) having SiH groups, represented by a formula shown below (viscosity: 4.6 mPa·s) (0.69 parts),

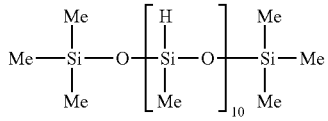

a vinyl group-containing polydimethylsiloxane (C-1) represented by an average composition formula shown below (viscosity: 7.5 mPa·s) (11.07 parts),

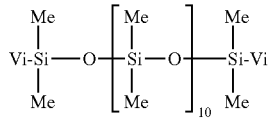

a polymethylhydrosiloxane (D-1) having SiH groups, represented by a formula shown below (viscosity: 4.5 mPa·s) (9.37 parts),

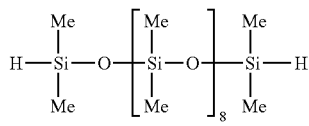

and a 60% toluene solution of a polyorganosiloxane (E) containing $Me_3SiO_{1/2}$ units and $SiO_2$ units, in which the molar ratio of $Me_3SiO_{1/2}$ units/$SiO_2$ units is 0.85 (100.0 parts) were mixed together, and the toluene was then removed by distillation under reduced pressure at 90° C. Following cooling, this product (100 parts) was combined and mixed with ethynylcyclohexanol (0.40 parts) and a silicone solution of a platinum-vinyl group-containing siloxane complex containing a platinum fraction of 0.5% by mass (1.0 parts), thus yielding a silicone pressure-sensitive adhesive composition.

The viscosity at 25° C., adhesive strength, holding power, probe tack and removability of this silicone pressure-sensitive adhesive were measured. The results are shown in Table 1.

Comparative Example 1

A vinyl group-containing polydimethylsiloxane (A-2) represented by an average composition formula shown below (viscosity: 1,000 mPa·s) (39.06 parts),

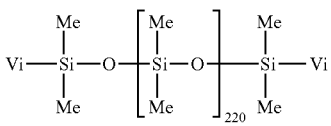

a polymethylhydrosiloxane (B-1) having SiH groups, represented by a formula shown below (viscosity: 4.6 mPa·s) (0.94 parts),

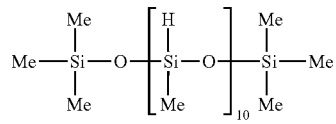

and a 60% toluene solution of a polyorganosiloxane (E) containing $Me_3SiO_{1/2}$ units and $SiO_2$ units, in which the molar ratio of $Me_3SiO_{1/2}$ units/$SiO_2$ units is 0.85 (100.0 parts) were mixed together, and the toluene was then removed by distillation under reduced pressure at 90° C. Following cooling, this product (100 parts) was combined and mixed with ethynylcyclohexanol (0.40 parts) and a silicone solution of a platinum-vinyl group-containing siloxane complex containing a platinum fraction of 0.5% by mass (1.0 parts), thus yielding a silicone pressure-sensitive adhesive composition.

The viscosity at 25° C. of this silicone pressure-sensitive adhesive is shown in Table 1. Because the viscosity of this composition was high, when an attempt was made to apply the composition using an applicator, streaks occurred in the pressure-sensitive adhesive surface, and a uniform coating could not be achieved.

Comparative Example 2

A vinyl group-containing polydimethylsiloxane (A-3) represented by an average composition formula shown below (viscosity: 100 mPa·s) (37.98 parts),

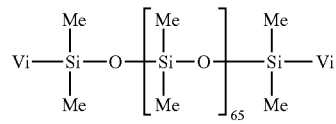

a polymethylhydrosiloxane (B-1) having SiH groups, represented by a formula shown below (viscosity: 4.6 mPa·s) (2.02 parts),

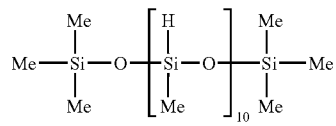

and a 60% toluene solution of a polyorganosiloxane (E) containing $Me_3SiO_{1/2}$ units and $SiO_2$ units, in which the molar ratio of $Me_3SiO_{1/2}$ units/$SiO_2$ units is 0.85 (91.67 parts) were mixed together, and the toluene was then removed by distillation under reduced pressure at 90° C. Following cooling, this product (100 parts) was combined and mixed with ethynylcyclohexanol (0.40 parts) and a silicone solution of a platinum-vinyl group-containing siloxane complex containing a platinum fraction of 0.5% by mass (1.0 parts), thus yielding a silicone pressure-sensitive adhesive composition.

The viscosity at 25° C. of this silicone pressure-sensitive adhesive is shown in Table 1. Because the viscosity of this composition was high, when an attempt was made to apply the composition using an applicator, streaks occurred in the pressure-sensitive adhesive surface, and a uniform coating could not be achieved.

Comparative Example 3

A vinyl group-containing polydimethylsiloxane (A-3) represented by an average composition formula shown below (viscosity: 100 mPa·s) (32.32 parts),

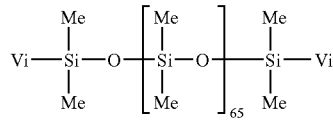

a polymethylhydrosiloxane (B-2) having SiH groups, represented by a formula shown below (viscosity: 27.5 mPa·s) (12.68 parts),

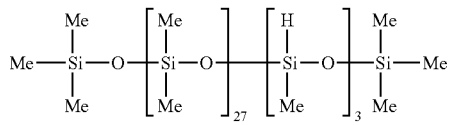

and a 60% toluene solution of a polyorganosiloxane (E) containing $Me_3SiO_{1/2}$ units and $SiO_2$ units, in which the molar ratio of $Me_3SiO_{1/2}$ units/$SiO_2$ units is 0.85 (91.67 parts) were mixed together, and the toluene was then removed by distillation under reduced pressure at 90° C. Following cooling, this product (100 parts) was combined and mixed with ethynylcyclohexanol (0.40 parts) and a silicone solution of a platinum-vinyl group-containing siloxane complex containing a platinum fraction of 0.5% by mass (1.0 parts), thus yielding a silicone pressure-sensitive adhesive composition.

The viscosity at 25° C., adhesive strength, holding power, probe tack and removability of this silicone pressure-sensitive adhesive were measured. The results are shown in Table 1.

Comparative Example 4

A vinyl group-containing polydimethylsiloxane (A-1) represented by an average composition formula shown below (viscosity: 100,000 mPa·s) (19.38 parts),

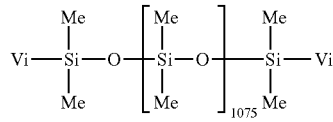

a polymethylhydrosiloxane (B-1) having SiH groups, represented by a formula shown below (viscosity: 4.6 mPa·s) (0.28 parts),

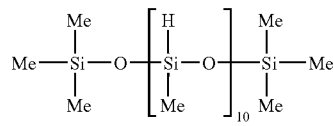

a vinyl group-containing polydimethylsiloxane (C-3) represented by an average composition formula shown below (viscosity: 22.0 mPa·s) (10.08 parts),

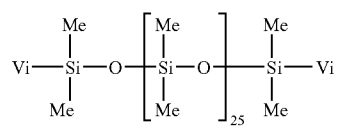

a polymethylhydrosiloxane (D-3) having SiH groups, represented by a formula shown below (viscosity: 18.0 mPa·s) (10.26 parts),

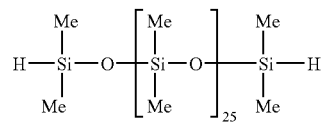

and a 60% toluene solution of a polyorganosiloxane (E) containing $Me_3SiO_{1/2}$ units and $SiO_2$ units, in which the molar ratio of $Me_3SiO_{1/2}$ units/$SiO_2$ units is 0.85 (100.0 parts) were mixed together, and the toluene was then removed by distillation under reduced pressure at 90° C. Following cooling, this product (100 parts) was combined and mixed with ethynylcyclohexanol (0.40 parts) and a silicone solution of a platinum-vinyl group-containing siloxane complex containing a platinum fraction of 0.5% by mass (1.0 parts), thus yielding a silicone pressure-sensitive adhesive composition.

The viscosity at 25° C. of this silicone pressure-sensitive adhesive is shown in Table 1. Because the viscosity of this composition was high, when an attempt was made to apply the composition using an applicator, streaks occurred in the pressure-sensitive adhesive surface, and a uniform coating could not be achieved.

TABLE 1

| Blend ratio (parts by mass) | | Example | | | | | | | Comparative example | | | |
|---|---|---|---|---|---|---|---|---|---|---|---|---|
| | | 1 | 2 | 3 | 4 | 5 | 6 | 7 | 1 | 2 | 3 | 4 |
| (A) | A-1 | 28.65 | 13.58 | 18.03 | 19.50 | | 19.51 | | | | | 19.38 |
| | A-2 | | | | | | | 18.87 | 39.06 | | | |
| | A-3 | | | | | | | | | 37.98 | 32.32 | |
| | A-4 | | | | | 19.22 | | | | | | |
| (B) | B-1 | 0.52 | 0.82 | 0.60 | 0.65 | 0.67 | 0.52 | 0.69 | 0.94 | 2.02 | | 0.28 |
| | B-2 | | | | | | | | | | 12.68 | |

TABLE 1-continued

| Blend ratio (parts by mass) | Example 1 | Example 2 | Example 3 | Example 4 | Example 5 | Example 6 | Example 7 | Comparative example 1 | Comparative example 2 | Comparative example 3 | Comparative example 4 |
|---|---|---|---|---|---|---|---|---|---|---|---|
| (C) C-1 | 8.77 | 14.34 | 10.25 | 11.08 | 11.07 | | 11.07 | | | | |
| C-2 | | | | | | 10.82 | | | | | |
| C-3 | | | | | | | | | | | 10.08 |
| (D) D-1 | 7.06 | 11.25 | 8.12 | 8.78 | 9.04 | | 9.37 | | | | |
| D-2 | | | | | | 9.15 | | | | | |
| D-3 | | | | | | | | | | | 10.26 |
| (E) | 55 | 60 | 63 | 60 | 60 | 60 | 60 | 60 | 60 | 55 | 60 |
| Viscosity (mPa·s) | 32,200 | 13,000 | 83,500 | 57,900 | 12,600 | 78,000 | 7,500 | 840,000 | 186,000 | 15,100 | 134,000 |
| Adhesive strength (N/25 mm) | 2.6 | 3.0 | 5.8 | 4.6 | 3.5 | 4.9 | 2.1 | *1 | *1 | 1.5 | *1 |
| Holding power (mm) | 0.03 | 0.03 | 0.03 | 0.02 | 0.02 | 0.03 | 0.04 | *1 | *1 | 0.01 | *1 |
| Tack (N/5 mmφ) | 7.8 | 5.4 | 2.9 | 5.2 | 3.6 | 3.0 | 2.3 | *1 | *1 | 5.0 | *1 |
| Removability | Good | Good | Good | Good | Good | Good | Good | *1 | *1 | Good*2 | *1 |

*1 The viscosity was too high, and coating was impossible.
*2 Peeling occurred at one portion at the edge of the pressure-sensitive adhesive tape.

What is claimed is:

1. A solventless silicone pressure-sensitive adhesive composition comprising:

(A) a polyorganosiloxane having at least two alkenyl group-containing organic groups within each molecule, as represented by an average composition formula (1) shown below:

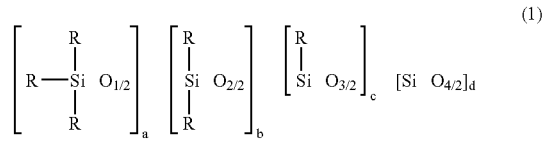

(1)

wherein, R represents identical or different monovalent hydrocarbon groups of 1 to 10 carbon atoms, provided that at least two R groups contain alkenyl group-containing organic groups of 2 to 10 carbon atoms, a represents an integer of 2 or greater, b represents an integer of 1 or greater, and c and d each represent an integer of 0 or greater, provided that $300 \leq a+b+c+d \leq 2{,}000$, (B) a polyorganohydrosiloxane having at least three SiH groups within each molecule, (C) a polydiorganosiloxane having alkenyl groups at both terminals, as represented by a formula (2) shown below:

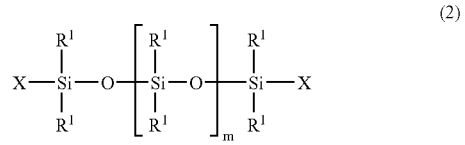

(2)

wherein, $R^1$ represents a methyl group or phenyl group, X represents an alkenyl group of 2 to 20 carbon atoms, and m satisfies $0 \leq m \leq 20$, (D) a polydiorganosiloxane having SiH groups at both terminals, as represented by a formula (3) shown below:

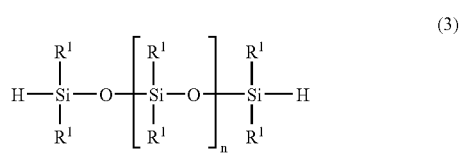

(3)

wherein, $R^1$ represents a methyl group or phenyl group, and n satisfies $0 \leq n \leq 20$, (E) a polyorganosiloxane consisting of $R^2{}_3SiO_{1/2}$ units and $SiO_2$ units, in which a molar ratio of $R^2{}_3SiO_{1/2}$ units/ $SiO_2$ units is within a range from 0.6 to 1.0 wherein $R^2$ represents a monovalent hydrocarbon group of 1 to 10 carbon atoms, and (F) a platinum-based catalyst, and wherein the viscosity of the composition at 25° C. is within a range from 500 to 100,000 mPa·s.

2. The composition according to claim 1, wherein the component (A) contains the alkenyl group-containing organic groups at both terminals of the molecular chain, as represented by the following composition formula:

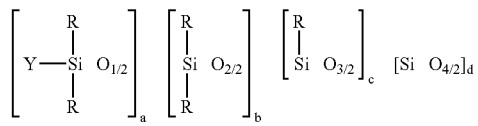

wherein Y represents an alkenyl group-containing organic group of 2 to 10 carbon atoms, and R, a, b, c and d are as defined above.

3. The composition according to claim 1, wherein the component (A) contains alkenyl groups within a range from 0.1 to 4 mol % relative to all of the organic groups within the polyorganosiloxane of the component (A).

4. The composition according to claim 1, wherein the viscosity at 25° C. of the polyorganosiloxane of the component (A) is within a range from 2,000 to 1,000,000 mPa·s.

5. The composition according to claim 1, wherein component (B) is at least one compound selected from the group consisting of polyorganohydrosiloxanes having at least three SiH groups within each molecule represented by average composition formulas (4) and (5) shown below:

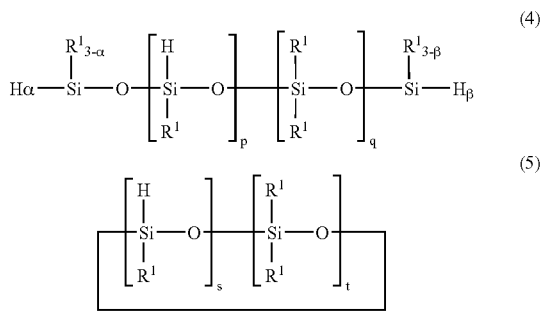

wherein, in each of the formulas (4) and (5), $R^1$ represents a methyl group or phenyl group; in the formula (4), $\alpha$ and $\beta$ each represent, independently, either 0 or 1, p represents an integer of 1 or greater, and q represents an integer of 0 or greater, provided that $\alpha+\beta+p$ is 3 or greater, and $1 \leq p+q \leq 500$; and in the formula (5), s represents an integer of 3 or greater, and t represents an integer of 0 or greater, provided that $3 \leq s+t \leq 8$.

6. The composition according to claim 1, wherein in the component (E), the molar ratio of $R^2_3SiO_{1/2}$ units/$SiO_2$ units is within a range from 0.65 to 0.90.

7. The composition according to claim 1, wherein a molar ratio of SiH groups within components (B) and (D) relative to alkenyl groups within components (A) and (C) is within a range from 0.5 to 5.

8. The composition according to claim 1, wherein relative to 100 parts by mass of a combined quantity of components (A), (B), (C), (D) and (E), a combined quantity of components (A), (B), (C) and (D) is within a range from 70 to 30 parts by mass and a quantity of component (E) is within a range from 30 to 70 parts by mass.

9. The composition according to claim 1, wherein the ratio of the component (A)/[the total of the component (C)+the component (D)] is within a range from 15/85 to 85/15.

10. The composition according to claim 1, wherein the ratio of the component (B)/[the total of the component (A)+the component (C)+the component (D)] is within a range from 0.2/99.8 to 5/95.

11. The composition according to claim 1, further comprising, as a component (G), from 0 to 8.0 parts by mass of a reaction retarder per 100 parts by mass of a combined quantity of components (A), (B), (C), (D) and (E).

* * * * *